United States Patent
Gabrius et al.

[19]

[11] Patent Number: 6,105,291
[45] Date of Patent: Aug. 22, 2000

[54] INTERNALLY ILLUMINATED SIGN MOUNTABLE ON A LIGHTING TRACK

[75] Inventors: Algimantas Gabrius, Carol Stream; Peter F. Wachter, Northfield; Franklin Fong, Wheeling, all of Ill.

[73] Assignee: Juno Manufacturing, Inc., Des Plaines, Ill.

[21] Appl. No.: 08/857,144

[22] Filed: May 15, 1997

[51] Int. Cl.⁷ ....................................................... G09F 13/04
[52] U.S. Cl. ................................................. 40/572; 40/575
[58] Field of Search .............................. 40/572, 575, 570

[56] References Cited

U.S. PATENT DOCUMENTS

| 2,155,936 | 4/1939 | Fuller | 40/572 |
| 3,562,942 | 2/1971 | Mabrey | 40/570 |
| 4,903,423 | 2/1990 | Hinca | 40/575 X |
| 4,953,067 | 8/1990 | Moore | 40/575 X |
| 5,048,210 | 9/1991 | Taylor et al. | 40/575 |
| 5,665,938 | 9/1997 | Boshear et al. | 40/572 X |
| 5,729,924 | 3/1998 | Reading | 40/575 X |

Primary Examiner—Joanne Silbermann
Attorney, Agent, or Firm—Anthony S. Zummer

[57] ABSTRACT

An internally illuminated sign is capable of being mounted on a lighting track. The sign includes an adapter for mechanical and electrical connection to the lighting track. A display housing is connected to the adapter. The housing has a substantially vertical face with a message window in the face. A translucent message assembly is removably mounted in the housing adjacent to the window. The housing has a movable section selectively relocateable relative to the message window to provide access to the interior of the housing for selective insertion into or removal from the housing said message assembly. An illumination source is mounted in the housing adjacent to the side of the translucent message assembly positioned away from the window to enhance visibility of a message on the message assembly through the message window.

19 Claims, 5 Drawing Sheets

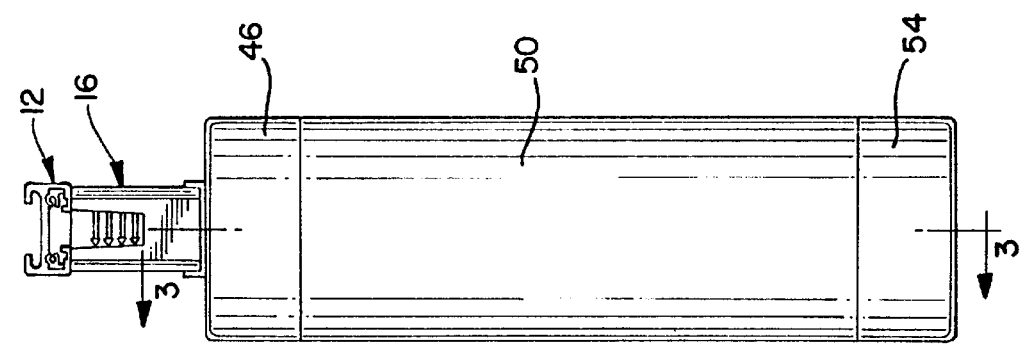
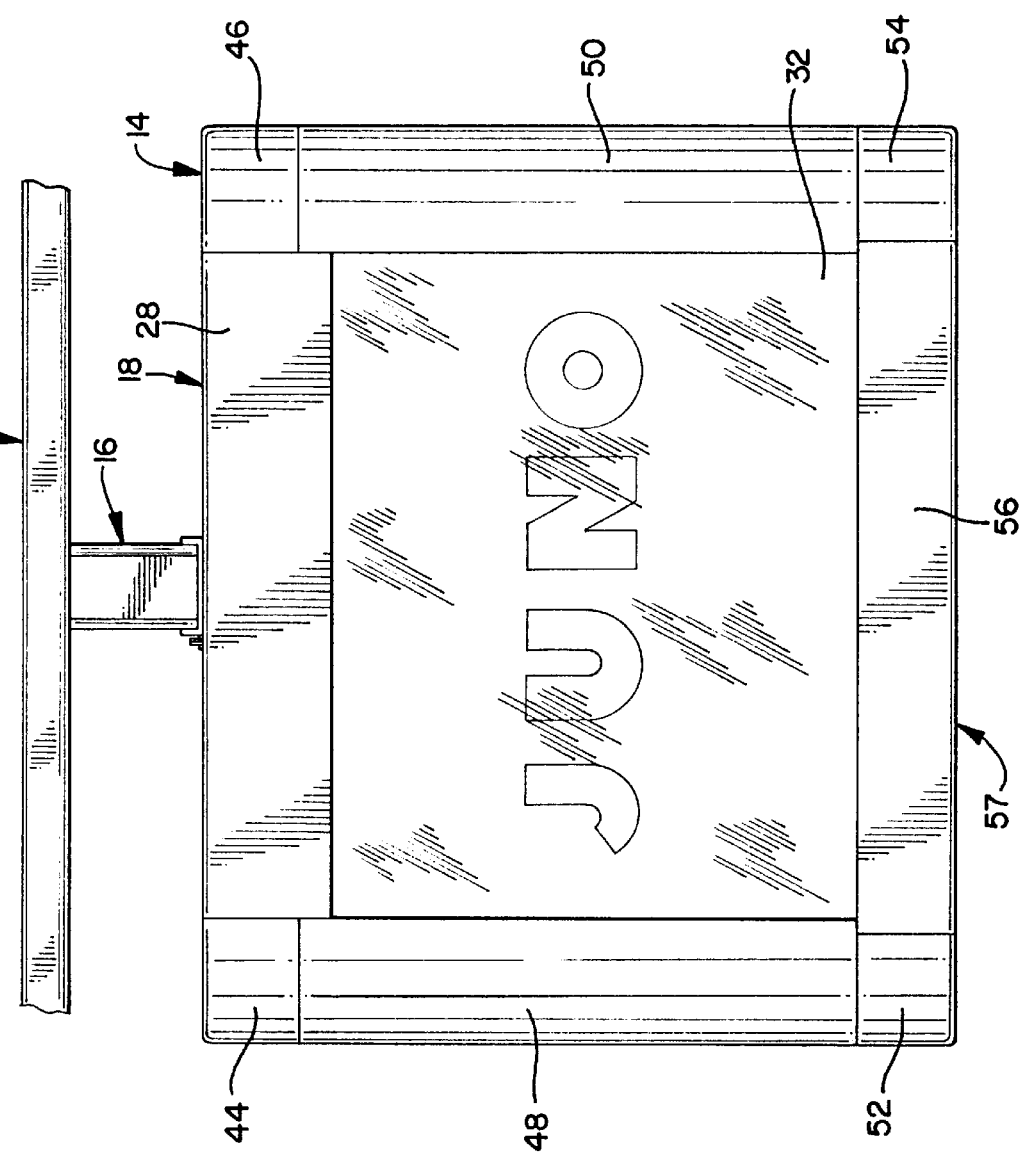

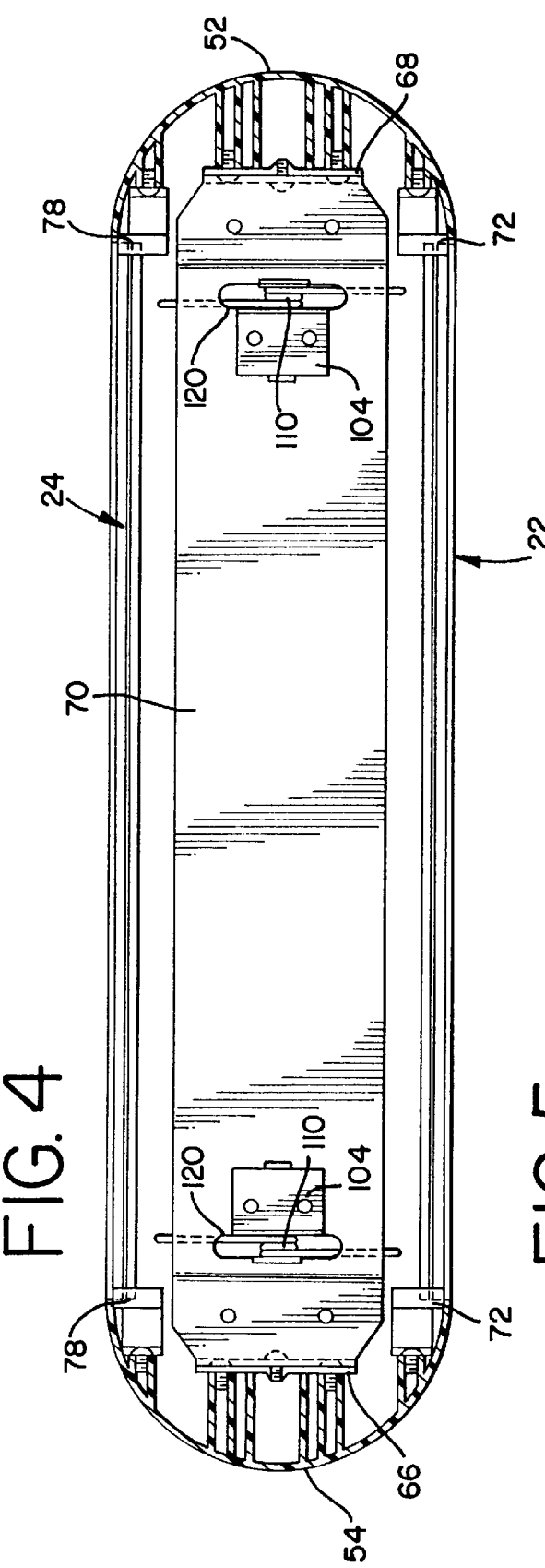
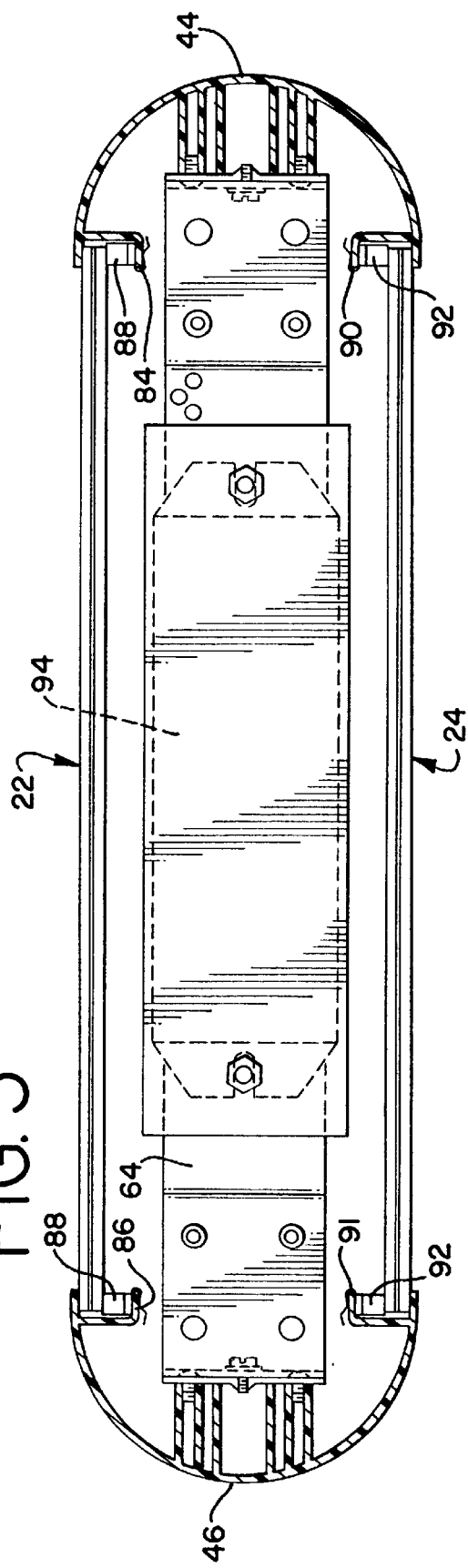
FIG. 4
FIG. 5

INTERNALLY ILLUMINATED SIGN MOUNTABLE ON A LIGHTING TRACK

BACKGROUND OF THE INVENTION

Track lighting is used in many commercial establishments, especially retail establishments. Track lighting has the advantage of allowing sources of light to be repositioned periodically to highlight different areas or subjects. It is desirable to provide informative signs as part of a track lighting system in a commercial establishment. By mounting an internally illuminated sign on a track, the sign may be utilized to deliver a message at a specific location. The sign may be periodically relocated, along with sources of light. The message displayed by the sign should be readily changed without the use of extensive tools or equipment to be economically effective. Furthermore, the change should be capable of being made by a relatively unskilled individual.

SUMMARY OF THE INVENTION

An internally illuminated sign may be selectively positioned on a lighting track. The sign includes an adapter for mechanical and electrical connection of the sign to a lighting track. The adapter is connected to a display housing and supports the housing. The housing includes a substantially vertical face. The face has a message window. A translucent message assembly is removably mounted in the housing adjacent to the message windows and is thereby exposed to view exteriorly of the sign. The housing has a movable section which may be selectively repositioned relative to the message windows to provide access to the interior of the housing for removal from or insertion into the housing the message assemblies and for re-lamping. An illumination source is mounted in the housing illuminating the translucent message assembly from the side of the message assembly positioned away from the window to enhance the visibility of the message in the message assembly.

BRIEF DESCRIPTION OF THE DRAWINGS

FIG. 1 is a front elevational view of an internally illuminated sign embodying the herein disclosed invention mounted on a conventional lighting track;

FIG. 2 is an end view of the internally illuminated sign of FIG. 1 showing an end view of the track;

FIG. 4 is a cross sectional view taken on line 4—4 of FIG. 3;

FIG. 5 is a cross sectional view taken on line 5—5 of FIG. 3;

DETAILED DESCRIPTION OF THE DRAWINGS

Figure 3:
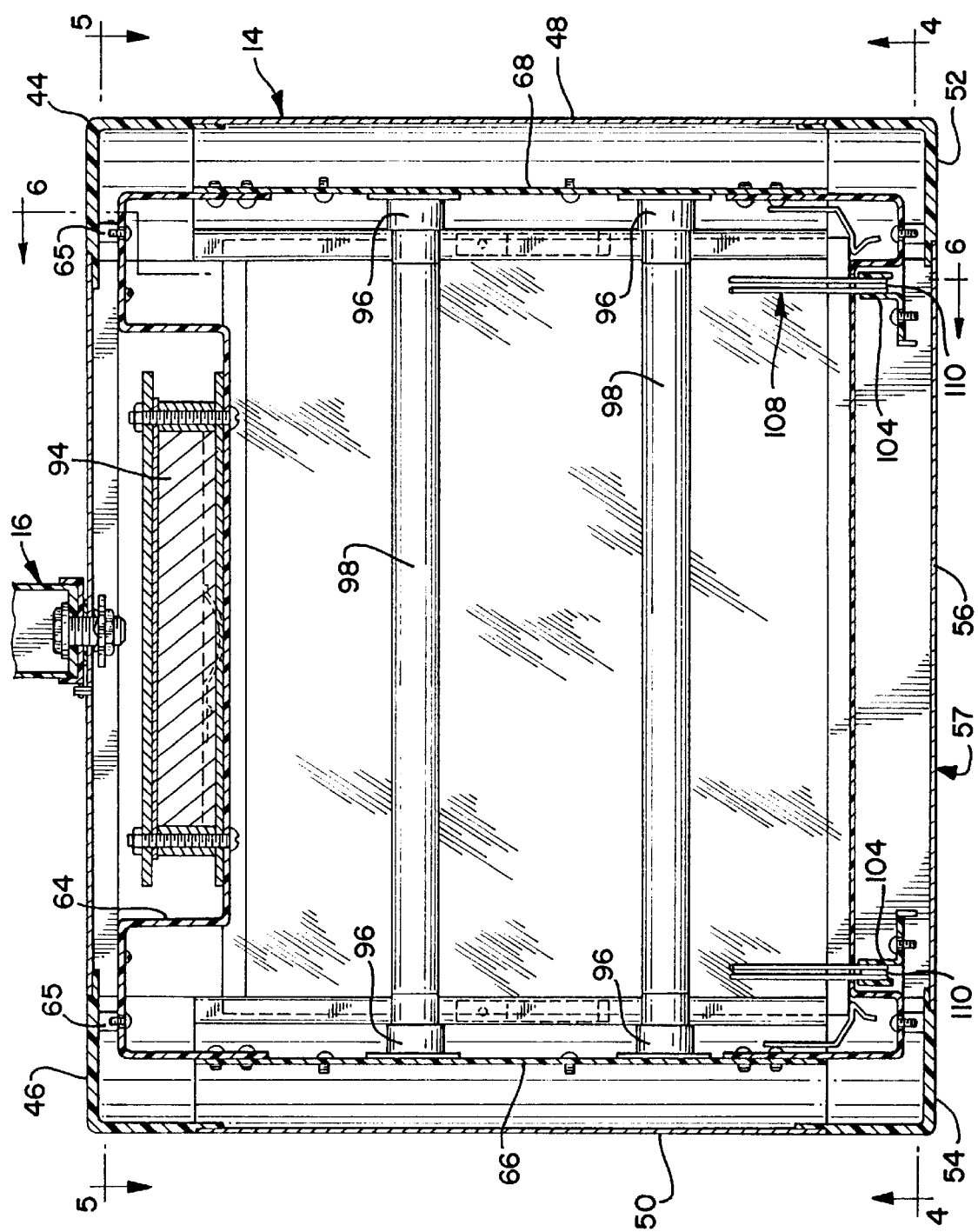
FIG. 3 is a cross sectional view taken on line 3—3 of FIG. 2.

Referring now the drawings, and especially to FIG. 1, a conventional lighting track 12 which is part of a conventional track lighting system is shown therein with an internally illuminated sign 14 electrically and mechanically connected to the track. Sign 14 is a specific embodiment of the subject invention and generally includes a conventional and well known adapter 16 mechanically and electrically connected to the track. A display housing 18 is mechanically and electrically connected to the adapter and supported thereby. An illumination source 20 is mounted in the housing. Identical translucent message assemblies 22 and 24 are mounted in the housing. Message assemblies 22 and 24 are back lighted by the illumination source to enhance visibility of a message contained in each message assembly.

Display housing 18 includes a top 26 with a vertical face 28 connected to one edge of the top and a vertical face 30 parallel to face 28 connected to the other and opposite edge of the top. Vertical face 28 includes a message window 32, and vertical face 30 includes a message window 34. A top section 36 is an extruded aluminum piece having a flat upper section 38 and a pair of side sections 40 and 42. A plastic end cap 44 is fixed to one end of the top section and a like plastic end cap 46 is fixed to the other end of the top section. The flat section 38 and the tops of end caps 44 and 46 cooperate to define top 26.

Extruded aluminum sides 48 and 50 are connected to the top caps 44 and 46, respectively. Bottom caps 52 and 54, which are like top caps 44 and 46 are fixed to an extruded aluminum bottom central portion 56 to provide a movable bottom section 57 removably mounted in engagement with sides 48 and 50. The bottom central portion 56 includes a flat bottom 58 and a pair of integral bottom sides 60 and 62. The bottom sides cooperate with the sides 40 and 42 of the top section and in part define the vertical faces 28 and 30, as well as windows 32 and 34.

A ballast bracket 64 is mounted in top 26. The ballast bracket is connected to top caps 44 and 46 by conventional screws 65. End plates 66 and 68 are connected to opposite ends of the ballast bracket 64, as may be best seen in FIG. 3. A support plate 70 is connected to the end plates 66 and 68.

Figure 6:
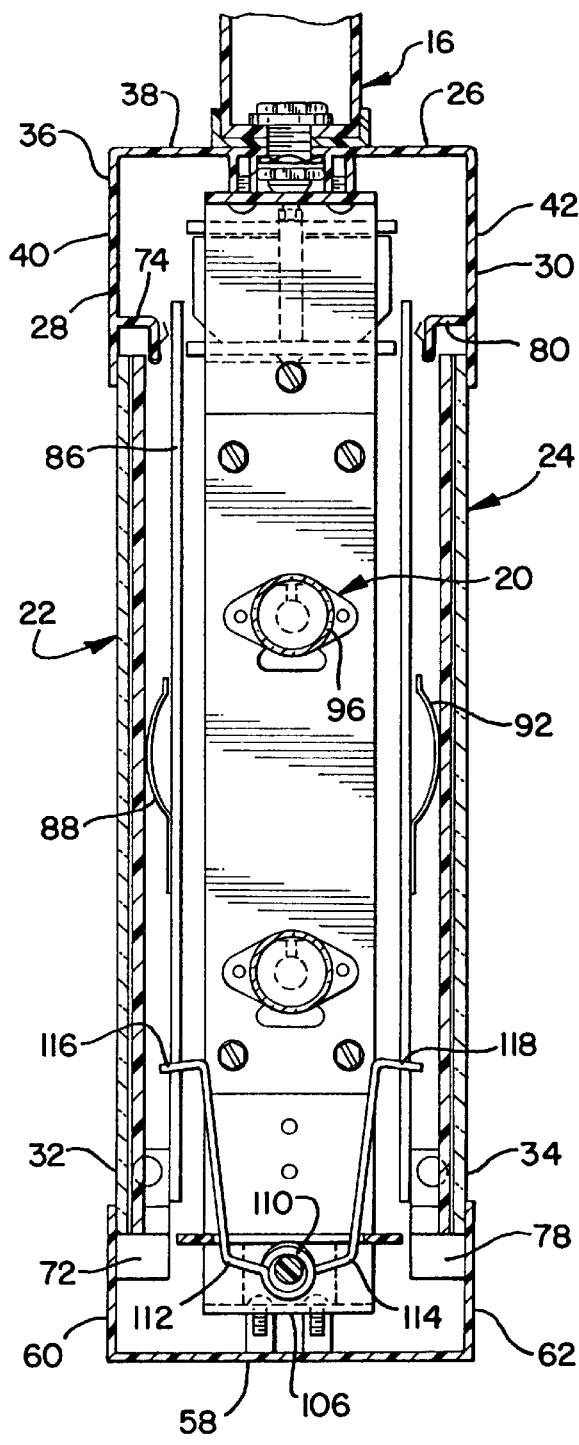
FIG. 6 is a cross sectional view taken on line 6—6 of FIG. 3.

As may be seen in FIG. 6, a message assembly trough 72 supports message assembly. A message assembly inverted trough 74 is connected to one side of sides 48 and 50 and receives the top portion of message assembly 22. In like manner, a message assembly trough 78 is connected to the lower caps 52 and 54 to receive message assembly 24. An inverted trough 80 is mounted on sides 48 and 50 to receive message assembly 24. Stabilizing edges 84 and 86 are formed in sides 48 and 50, respectively. Each of the stabilizing edges has a leaf spring 88 mounted thereon in engagement with an opposed edge of message assembly 22 to hold the message assembly adjacent to window 32 and thereby provide a resilient message assembly holding means. In a like manner, two stabilizer edges 90 and 91 are formed on the opposite side of sides 48 and 50 with a leaf spring 92 mounted on each of the edges 90 and 91 in engagement with message assembly 24 to hold resilient the message assembly adjacent to window 24 and thereby provide a second resiliently message assembly holding means.

Light source 20 includes a conventional ballast 94 mounted in the top on bracket 64. The ballast is connected to the track through adapter 16 by conventional wiring which is not shown herein. The ballast is also connected to four fluorescent tube receptacles 96 which receive and hold conventional fluorescent tubes 98. The fluorescent tubes 98 provide a light source to back light both message assemblies. The two message assemblies 22 and 24 are identical to each other in their construction. Each message assembly includes a translucent layer or sheet 98 which is a diffuser layer adapted to be positioned adjacent to the fluorescent tubes to diffuse the light from the tubes. In this instance, the layer is milk white; however, any other suitable diffuser may be utilized. A message layer 100 is a translucent film which has a message formed in the film. Illustrative of a message, which may be on the film, the word "JUNO" is shown formed on the film in a conventional and well known manner, the message may be a word or words, a pictorial message, or a combination therein. A transparent guard layer 102 is positioned adjacent to the message layer to protect the message layer. The three layers are parallel to each other with the message layer sandwiched between the guard layer and the diffuser layer.

Bottom 56 includes resilient bottom holding means, which includes a pair of support brackets 104, as may be best seen in FIGS. 3 and 6. Each of the support brackets includes a spring stud 106. An identical torsion spring 108 is connected to each of the support brackets 104 through respective studs 106. Each torsion spring includes a coil body 110 mounted on the respective stud 106. Outwardly extending arms 112 and 114 are formed integral with each of the coil bodies. The outwardly extending arms have respective retainer fingers 116 and 118 integrally formed therewith. The support plate includes a pair of spaced spring apertures 120. Spring arms 112 and 114 of the torsion springs are positioned in respective apertures 120.

Figure 7:
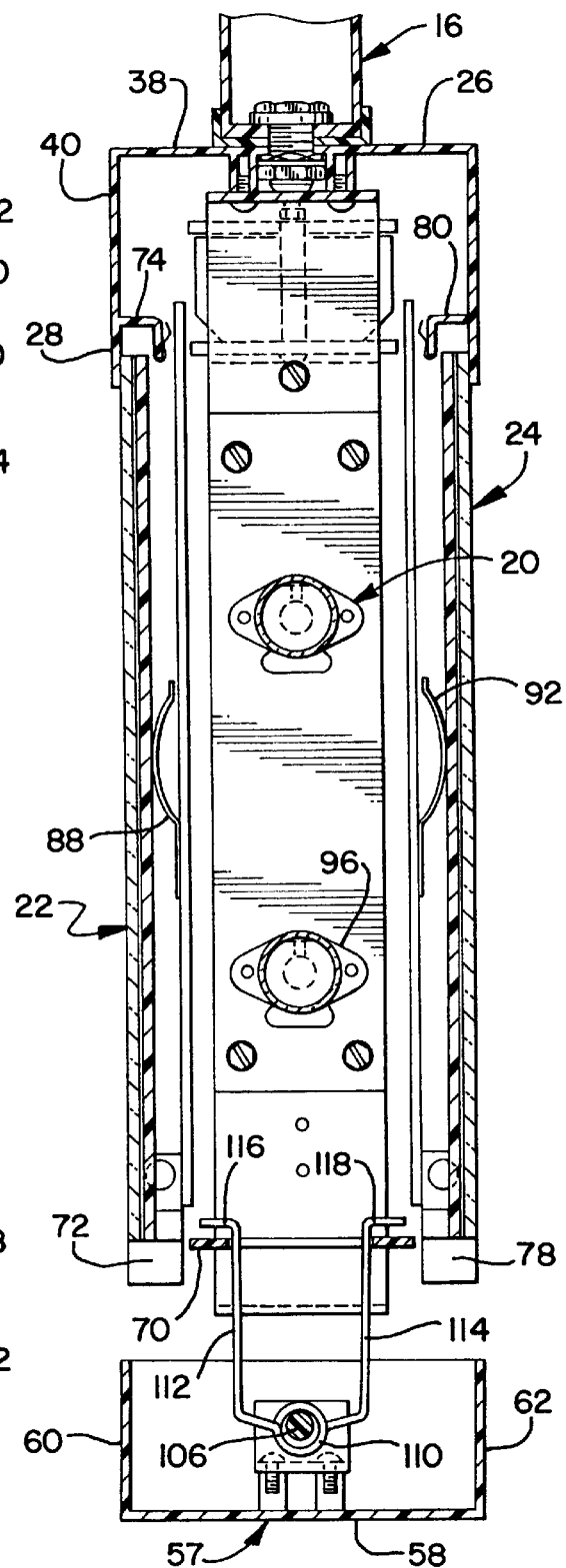
FIG. 7 is a cross sectional view substantially identical to FIG. 6, but showing a movable section of a sign housing repositioned for removal of a message assembly.
Figure 8:
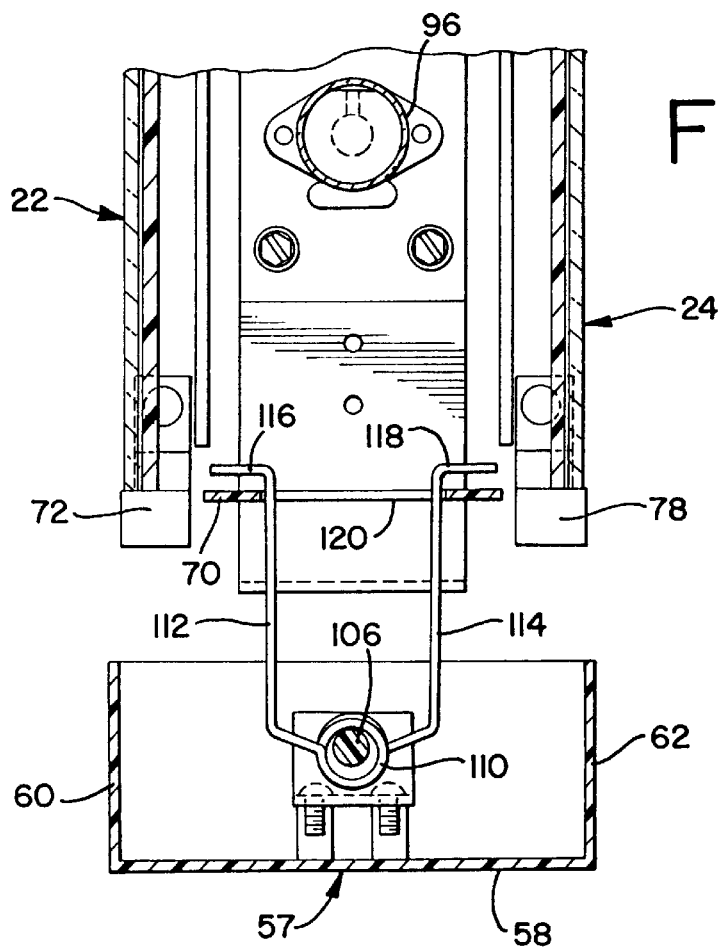
FIG. 8 is an enlarged cross sectional view of the lower portion of FIG. 7.
Figure 9:
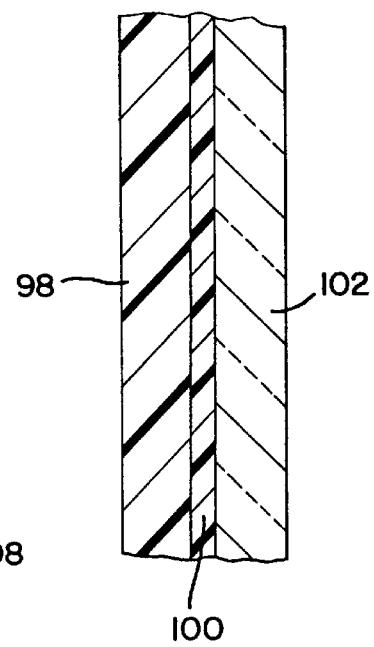
FIG. 9 is an enlarged cross sectional view of an end view portion of the message assembly.
Figure 10:
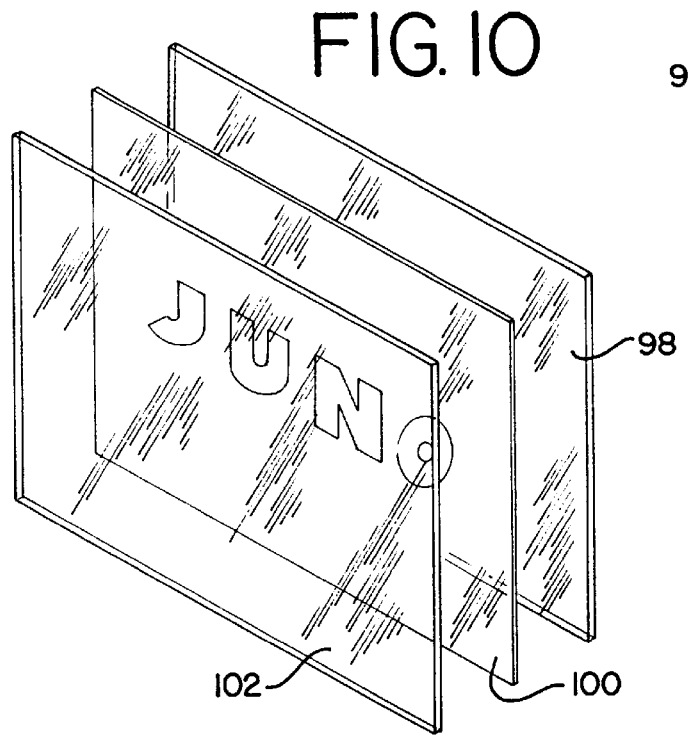
FIG. 10 is a perspective exploded view of the message assembly showing three layers which make up the message assembly.

The resilience of the torsion springs urges the bottom upward to the position shown in FIGS. 1, 3 and 6; thus, completing the housing. However, an application of a force downward forces the bottom to be displayed against the force of the torsion springs until retainers 116 and 118 engage plate 70, as shown in FIG. 7. Thus, the bottom is relocated away from the remainder of the housing a limited distance, but enough to allow access to the interior of the housing. Each message assembly may be individually removed by moving the respective message assembly upward so that the message assembly may be lifted out of the respective message assembly trough. The message assembly is removed from the housing by dropping the message assembly out through the portion of the housing formerly occupied by the bottom. Once the message assembly is removed, the message layer 100 is removed from between layers 98 and 102 and a new message layer with a different message is positioned between the layers 98 and 102. The message assembly with the different message is then inserted adjacent to its window simply by moving the message assembly into its respective inverted trough and sliding the message assembly fully into the respective message assembly trough against the force of the respective leaf springs. Either one or both of the message assemblies may be replaced in the manner described above. Once the change to the message has been completed, the bottom section is pushed upward and the spring arms move the bottom into its closed position and releasably lock the bottom into position.

From the foregoing, it is readily apparent that the messages in the message assembly may be readily and quickly changed in the sign by an unskilled person without the use of tools. The sign may be moved to another desired location on the track, as is conventional in track lighting assemblies.

Although a specific embodiment of the herein disclosed invention has been described in detail above, it is to be expressly understood that the subject invention is limited only by the appended claims.

What is claimed is:

1. An internally illuminated sign for mounting on a lighting track comprising; an adapter for mechanical and electrical connection to a lighting track, a display housing connected to the adapter, said housing having a substantially vertical first face, said vertical face having message window, a translucent message assembly removably mounted in the housing adjacent to the window, said housing having a movable section selectively relocatable relative to the message window to provide access to the interior of the housing for selective insertion into or removal from the housing said message assembly, and an illumination source mounted in the housing adjacent to the side of translucent message assembly positioned away from the window to enhance visibility of a message on the message assembly through the message window.

2. An internally illuminated sign for mounting on a lighting track as defined in claim 1, wherein said message assembly includes a diffuser layer adjacent to the illumination source, a message layer adjacent to the diffuser layer, the diffuser layer positioned between the illumination source and the message layer, and a guard layer between the message layer and the window.

3. An internally illuminated sign for mounting on a lighting track as defined in claim 1, wherein said housing includes a second substantially vertical face spaced from and parallel to the first-mentioned vertical face, said second vertical face having a second message window, and a second translucent message assembly removably mounted in the housing adjacent to the second message window between the second message window and the illumination source.

4. An internally illuminated sign for mounting on a lighting track as defined in claim 1, said movable section being the bottom of the housing, resilient bottom holding means releasably holding the movable section in position as part of the housing.

5. An internally illuminated sign for mounting on a lighting track as defined in claim 1, said movable section being the bottom of the housing, and resilient bottom holding means releasably holding the movable section in position as part of the housing, said resilient bottom holding means connecting the movable section to the remainder of the housing and limiting the distance of movement of the movable section away from the remainder of the housing.

6. An internally illuminated sign for mounting on a lighting track as defined in claim 1, including a trough mounted in said housing adjacent to the window releasably supporting the message assembly.

7. An internally illuminated sign for mounting on a lighting track as defined in claim 1, including a resilient message assembly holding means mounted in the housing releasably holding the message assembly adjacent to the window in the vertical face.

8. An internally illuminated sign for mounting on a lighting track as defined in claim 1, wherein said housing includes a second substantially vertical face spaced from and parallel to the first face, said second vertical face having a second message window, and a second translucent message assembly removably mounted in the housing adjacent to the second window between the second window and the illumination source, and each of said message assemblies includes a diffuser layer adjacent to the illumination source, a guard layer positioned adjacent to its respective message window, and a message layer positioned between the respective diffuser layer and the respective guard layer.

9. An internally illuminated sign for mounting on a lighting track as defined in claim 1, wherein said housing includes a second substantially vertical face spaced from and parallel to the first face, said second vertical face having a second message window, a second translucent message assembly removably mounted in the housing adjacent to the second message window between the second message window and the illumination source, said movable section being the bottom of the housing, and resilient bottom holding means releasably holding the movable section in position as part of the housing, said resilient bottom holding means connecting the movable section to the remainder of the housing and limiting the distance of removal of the movable section away from the housing.

10. An internally illuminated sign for mounting on a lighting track as defined in claim 1, wherein said housing includes a second substantially vertical face spaced from and parallel to the first face, said second vertical face having a second message window, a trough in said housing adjacent to the first face removably receiving the first-mentioned message assembly, a second trough mounted in said housing adjacent to the second message window, a second translucent message assembly removably mounted in said second trough adjacent to the second message window between the second message window and the illumination source, said movable section being the bottom of the housing, and resilient bottom holding means releasably holding the movable section in position as part of the housing, said resilient bottom holding means connecting the movable section to the remainder of the housing and limiting the distance of removal of the movable section away from the remainder of the housing.

11. An internally illuminated sign for mounting on a lighting track as defined in claim 1, wherein said housing includes a second substantially vertical face spaced from and parallel to the first face, said second vertical face having a second message window, a trough in said housing adjacent to the first-mentioned message window removably receiving the first-mentioned message assembly, a second trough mounted in said housing adjacent to the second message window, a second translucent message assembly removably mounted in the second trough adjacent to the second message window between the second message window and the illumination source, resilient message holding means mounted in the housing releasably holding each message assembly adjacent to the respective message window, each of said message assemblies including a diffuser layer positioned adjacent to the illumination source, a transparent guard layer adjacent to the respective message window, and a message layer between the respective diffuser layer and the respective guard layer, said movable section being the bottom of the housing, and resilient bottom holding means releasably holding the movable section as part of the housing, said resilient bottom holding means connecting the movable section to the remainder of the housing and limiting the distance of removal of the movable section away from the remainder of the housing.

12. An internally illuminated sign for mounting on a lighting track comprising; an adapter for mechanical and electrical connection to a lighting track, an elongated top having opposed ends, said top connected to the adapter, a pair of opposed end plates connected to opposite ends of the top, a first vertical face connected to the top, said vertical face having a message window, a message assembly trough positioned adjacent to the message window between the end plates, a light source mounted between the end plates, a translucent message assembly removably mounted in the message assembly trough and positioned between the message window and the light source, and a movable bottom connected to the end plates providing access to the message assembly upon relocation away from the end plates.

13. An internally illuminated sign for mounting on a lighting track as defined in claim 12, including a second vertical face connected to the top, said second vertical face having a second message window, a second message assembly trough positioned between the end plates adjacent to the second message window, and a second translucent message assembly removably mounted in the second message assembly trough and positioned between the second message window and the light source.

14. An internally illuminated sign for mounting on a lighting track as defined in claim 12, wherein the translucent message assembly includes a guard layer positioned adjacent to the message window, a translucent layer positioned adjacent to the light source, and a message layer parallel to the translucent layer and the guard layer and positioned between the translucent layer and the guard layer.

15. An internally illuminated sign for mounting on a lighting track as defined in claim 12, including resilient bottom holding means connecting the movable bottom to the end plates and limiting the distance of relocation of the bottom away from the end plates.

16. An internally illuminated sign for mounting on a lighting track as defined in claim 12, including a second vertical face connected to the top, said second vertical face spaced from and parallel to the first vertical face, said second vertical face having a message window, a second message trough positioned between the end plates adjacent to the second message window, a second translucent message assembly removably mounted in the second message trough and positioned between the second message window and the light source, each of said translucent message assemblies including a translucent layer positioned adjacent to the light source, a guard layer positioned adjacent to the respective message window, and a message layer parallel to the respective translucent layer and the respective guard layer and positioned between the respective translucent layer and the respective guard layer.

17. An internally illuminated sign for mounting on a lighting track as defined in claim 12, including resilient bottom holding means connecting the movable bottom to the end plates and limiting the distance of relocation of the bottom away from the end plates, a second vertical face connected to the top, said second vertical face being spaced away from and parallel to the first vertical face, said second vertical face having a second message window, a second message trough positioned between the end plates adjacent to the second message window, and a second translucent message assembly removably mounted in the second message trough and positioned between the second message window and the light source.

18. An internally illuminated sign for mounting on a lighting track as defined in claim 12, including resilient bottom holding means connecting the movable bottom to the end plates and limiting the distance of relocation of the bottom away from the end plates, a second vertical face connected to the top, said second vertical face being spaced from and parallel to the first vertical face, said second vertical face having a second message window, a second message assembly trough positioned between the end plates adjacent to the second message window, a second translucent message assembly removably mounted in the second message assembly trough and positioned between the second message window and the light source, each of said translucent message assemblies including a translucent layer positioned adjacent to the light source, a guard layer positioned adjacent to the respective message window, and a message layer parallel to the respective translucent layer and the respective guard layer and positioned between the respective translucent layer and the respective guard layer.

19. An internally illuminated sign for mounting on a lighting track as defined in claim 12, including resilient bottom holding means connecting the movable bottom to the end plates and limiting the distance of relocation of the bottom away from the end plates, a second vertical face connected to the top, said second vertical face being spaced from and substantially parallel to the first vertical face, said second vertical face having a second message window, a second message assembly trough positioned between the end plates adjacent to the second message window, a second translucent message assembly removably mounted in the second message assembly trough and positioned between the second message window and the light source, resilient message assembly holding means releasably holding each message assembly adjacent to the respective message window, each of said translucent message assemblies including a translucent layer positioned between the light source and the respective message window, a translucent message layer parallel to the respective translucent layer and positioned between the respective translucent layer and the respective message window, and a transparent guard layer positioned between each respective message layer and the respective message window and parallel to the respective message layer and the respective translucent layer.

\* \* \* \* \*